United States Patent
Mukasa (10) Patent No.: US 10,452,322 B2
(45) Date of Patent: Oct. 22, 2019

(54) INFORMATION PROCESSING DEVICE, INFORMATION PROCESSING SYSTEM, AND COMPUTER PROGRAM PRODUCT

(71) Applicant: Shinya Mukasa, Shizuoka (JP)

(72) Inventor: Shinya Mukasa, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 48 days.

(21) Appl. No.: 15/206,678

(22) Filed: Jul. 11, 2016

(65) Prior Publication Data

US 2017/0017430 A1    Jan. 19, 2017

(30) Foreign Application Priority Data

Jul. 15, 2015 (JP) .................................. 2015-141669
Jun. 17, 2016 (JP) .................................. 2016-120763

(51) Int. Cl.
*G06F 3/12* (2006.01)

(52) U.S. Cl.
CPC .......... *G06F 3/1203* (2013.01); *G06F 3/1239* (2013.01); *G06F 3/1274* (2013.01); *G06F 3/1285* (2013.01); *G06F 3/127* (2013.01); *G06F 3/1275* (2013.01)

(58) Field of Classification Search
CPC .................................................. G06F 15/167
See application file for complete search history.

(56) References Cited

U.S. PATENT DOCUMENTS

| | | | | |
|---|---|---|---|---|
| 2009/0241103 A1* | 9/2009 | Pennisi | ................. | G06F 8/65 717/173 |
| 2012/0162708 A1* | 6/2012 | Hagiwara | ............. | G06F 3/1204 358/1.15 |
| 2012/0182580 A1* | 7/2012 | Yamashita | ............ | G06F 3/1203 358/1.16 |
| 2012/0257917 A1* | 10/2012 | Bockus, Jr. | ............. | G06F 3/121 400/76 |
| 2013/0271780 A1* | 10/2013 | Sugiyama | ............. | G06F 3/1297 358/1.13 |
| 2013/0335778 A1* | 12/2013 | Sugiyama | ............. | G06F 3/1273 358/1.16 |
| 2014/0268208 A1 | 9/2014 | Hirakata | | |
| 2015/0095988 A1 | 4/2015 | Hirakata | | |
| 2015/0161407 A1 | 6/2015 | Hirakata | | |
| 2015/0205510 A1 | 7/2015 | Hirakata | | |

(Continued)

FOREIGN PATENT DOCUMENTS

JP    2014-178896    9/2014

OTHER PUBLICATIONS

"Operating System—Security", tutorialspoint, https://web.archive.org/web/20140210123236/https://www.tutorialspoint.com/operating_system/os_security.htm (Year: 2014).*

*Primary Examiner* — Edward J Dudek, Jr.

(74) *Attorney, Agent, or Firm* — Harness, Dickey & Pierce P.L.C.

(57) ABSTRACT

An information processing device includes a detection unit, a determining unit, and an execution unit. The detection unit detects that data is stored in a predetermined storage area in a memory. The determining unit determines whether the data stored in the predetermined storage area satisfies an execution condition of predetermined processing associated with the predetermined storage area. The execution unit executes the predetermined processing when the data satisfies the execution condition.

19 Claims, 10 Drawing Sheets

(56) References Cited

U.S. PATENT DOCUMENTS

| 2015/0244832 | A1 | 8/2015 | Hirakata |
| 2016/0094671 | A1 | 3/2016 | Hirakata |
| 2016/0147527 | A1* | 5/2016 | Lo .......................... G06F 8/665 |
| | | | 717/173 |

* cited by examiner

FIG.3

| WORKFLOW SETTING | |
|---|---|
| WORKFLOW NAME:<br>REGULAR DELETION | REFERENCE... |

PROCESSING:
DELETE FILE ▽

EXECUTION TIMING:
AFTER 3 MINUTES ▽

EXECUTION CONDITION:
DATA NAME CONTAINS CHARACTER STRING BELOW ▽
REQUEST

STORAGE DESTINATION:
NIL

NOTIFICATION DESTINATION:
hoge@fuga.ne.jp

FIG.4

| ID | WORKFLOW NAME | PROCESS-ING | EXECUTION TIMING | EXECUTION CONDITION | STORAGE DESTINATION | NOTIFICATION DESTINATION |
|---|---|---|---|---|---|---|
| 01 | REGULAR DELETION | DELETE DATA | AFTER 3 MINUTES | DATA CONTAINS CHARACTER STRING BELOW REQUEST | NIL | hoge@fuga.ne.jp |
| 02 | PRINT | PRINT | AFTER 0 MINUTES | DATA NAME CONTAINS CHARACTER STRING BELOW QUOTATION | MFP-A | NIL |
| 03 | CONVER-SION TO PDF | CONVERT TO PDF | AFTER 0 MINUTES | DATA IS IN DATA FORMAT BELOW JPEG DATA | 1. FILE¥PDF | hoge@fuga.ne.jp |
| ... | ... | ... | ... | ... | ... | ... |

INFORMATION PROCESSING DEVICE, INFORMATION PROCESSING SYSTEM, AND COMPUTER PROGRAM PRODUCT

CROSS-REFERENCE TO RELATED APPLICATIONS

The present application claims priority under 35 U.S.C. § 119 to Japanese Patent Application No. 2015-141669, filed Jul. 15, 2015 and Japanese Patent Application No. 2016-120763, filed on Jun. 17, 2016. The contents of which are incorporated herein by reference in their entirety.

BACKGROUND OF THE INVENTION

1. Field of the Invention

The present invention relates to an information processing device, an information processing system, and a computer program product.

2. Description of the Related Art

Technologies related to workflow processing systems are known. In a workflow processing system, predetermined processing is performed on data when the data is stored in a predetermined storage area such as a shared folder (shared directory) in an information processing device to which the predetermined processing is set in advance.

Japanese Unexamined Patent Application Publication No. 2014-178896 discloses an information processing device that determines, when a workflow set in advance to a folder is to output data to an apparatus, detailed processing on electric data stored in the folder based on the performance of the apparatus.

However, when a user mistakenly stores data in a storage area such as a folder to which certain workflow processing is set, such a conventional information processing device performs the workflow processing on the data that is not intended to be subjected to such processing. For example, when the user mistakenly stores data in a folder to which data deletion processing is set, the data is deleted against the user's intention.

SUMMARY OF THE INVENTION

According to one aspect of the present invention, an information processing device includes a detection unit, a determining unit, and an execution unit. The detection unit detects that data is stored in a predetermined storage area in a memory. The determining unit determines whether the data stored in the predetermined storage area satisfies an execution condition of predetermined processing associated with the predetermined storage area. The execution unit executes the predetermined processing when the data satisfies the execution condition.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENT

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide an information processing device, an information processing system, and a computer program product that are capable of preventing data from being subjected to predetermined processing associated with a predetermined storage area when the data is stored in the predetermined storage area but the data is not intended to be subjected to such processing.

Figure 1:
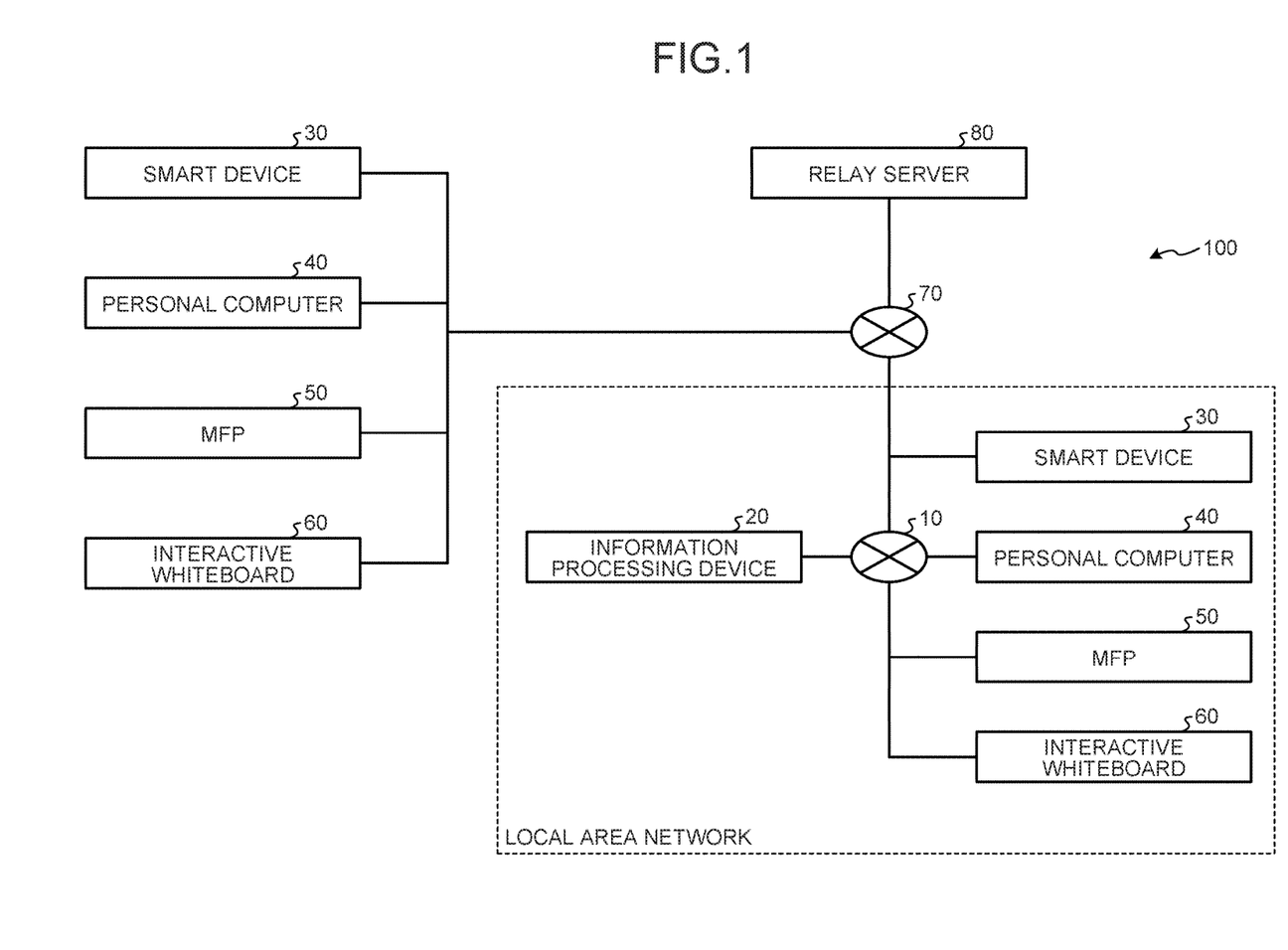
FIG. 1 is a diagram illustrating an example of a configuration of an information processing system according to an embodiment.

FIG. 1 is a diagram illustrating an example of a configuration of an information processing system 100 according to the embodiment. The information processing system 100 according to the embodiment includes an information processing device 20 and electronic devices such as a smart device 30, a personal computer 40, a multifunction peripheral (MFP) 50, and an interactive whiteboard 60. Although the smart device 30, the personal computer 40, the MFP 50, and the interactive whiteboard 60 are mentioned as examples of the electronic devices, the electronic devices are not limited to these. The electronic devices may be any device that can input or output data to or from the information processing device 20, such as a projector, a camera, a conference system device, a microphone, and a speaker. The information processing device 20, the smart device 30, the personal computer 40, the MFP 50, and the interactive whiteboard 60 are connected with each other via a network 10. The network 10 may be a wired network or a wireless network, or may be implemented by combined use of wired and wireless networks.

The network 10 may be configured as a local area network and connected to a relay server 80 via an external network 70 such as the Internet. Electronic devices such as the smart device 30, the personal computer 40, the MFP 50, and the interactive whiteboard 60 connected to the external network 70 may be allowed to access devices such as the information processing device 20 connected to the network 10 that is a local area network via the relay server 80.

In the information processing system 100 configured as described above, for example, the electronic devices connected to the external network 70 send a request addressed to a device connected to the network 10 to the relay server 80, and the relay server 80 stores the request. The devices such as the information processing device 20 connected to the network 10 query, at regular intervals, the relay server 80 as to whether any request addressed to the devices is stored in the relay server 80. When the relay server 80 stores a request addressed to a device that queries the relay server 80, the relay server 80 transmits the stored request to the device that queries the relay server 80 for the request.

With the procedure above, the devices on the external network 70 and the devices on the network 10 that is a local area network can transmit and receive requests to and from each other beyond a firewall that protects the local area network.

The information processing device 20 performs workflow processing. The workflow processing is predetermined processing to be performed on data when the data is stored in a predetermined storage area in a memory of the information processing device 20. The predetermined processing is set in advance to the predetermined storage area. When the data is a file, the predetermined storage area is, for example, a folder that stores files such as a shared folder (shared directory) or a user folder.

The smart device 30, the personal computer 40, the MFP 50, and the interactive whiteboard 60 store data in workflow folders in the information processing device 20. Examples of the smart device 30 include smart phones and tablets. Examples of the personal computer 40 include desktop computers and laptop computers. MFP 50 is a device having, for example, copying function, printing function, scanner function, and facsimile function. The interactive whiteboard 60 is a device that can convert what is written or drawn on the board surface to electronic data. The interactive whiteboard 60 includes, for example, a device that generates image data by copying the whiteboard, or a device that generates image data by detecting what is written or drawn on a monitor with an electronic pen.

Described next is an example of a functional configuration of the information processing device 20 according to the embodiment.

Figure 2:
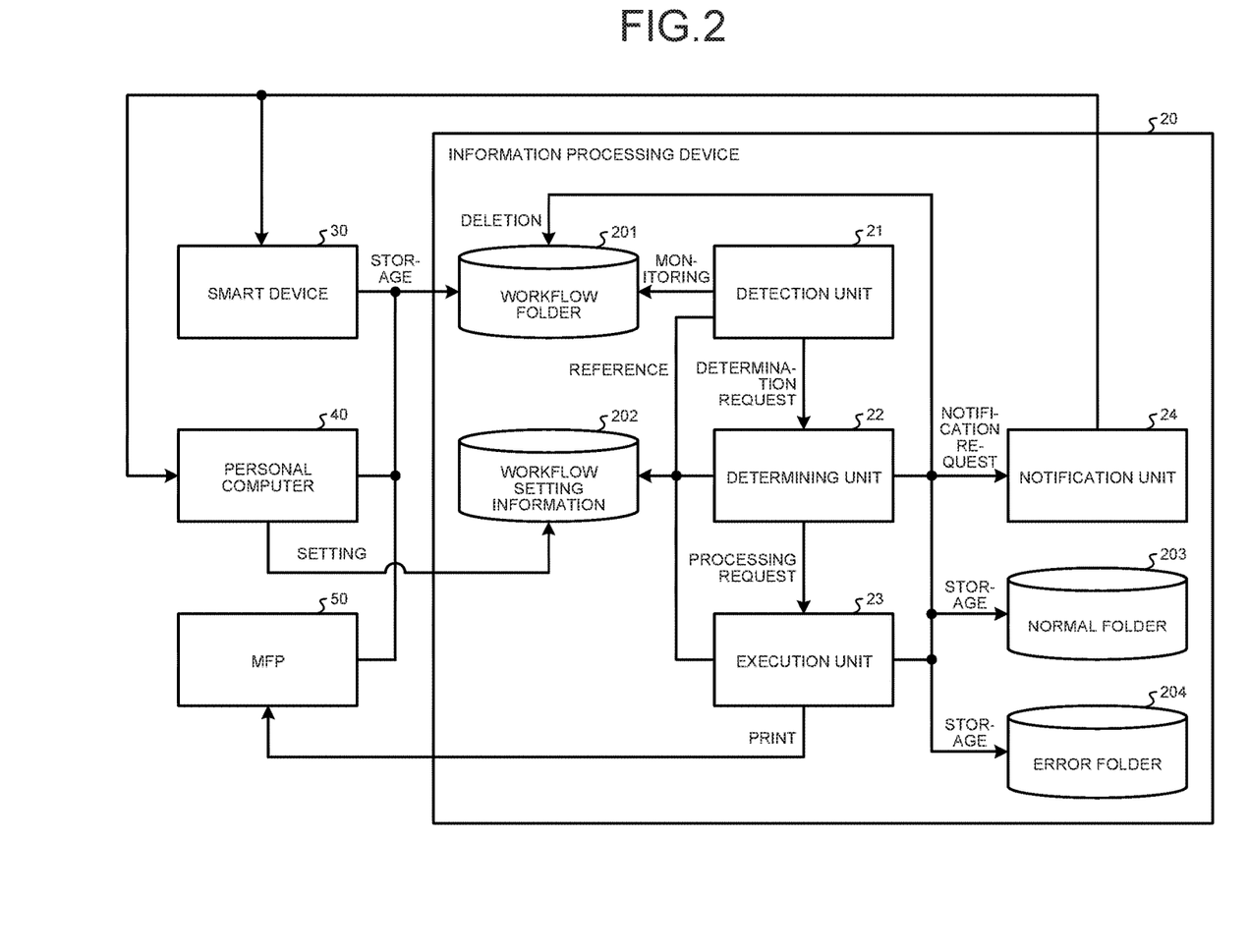
FIG. 2 is a diagram illustrating an example of a functional configuration of an information processing device according to the embodiment.

FIG. 2 is a diagram illustrating an example of the functional configuration of the information processing device 20 according to the embodiment. The information processing device 20 according to the embodiment includes a detection unit 21, a determining unit 22, an execution unit 23, and a notification unit 24. The information processing device 20 according to the embodiment stores workflow folders 201, workflow setting information 202, a normal folder 203, and an error folder 204 in a memory of the information processing device 20.

The workflow folders 201 store therein data to be subjected to workflow processing. When the embodiment describes individual workflow folders 201, the workflow folders 201 are referred to as workflow folders 201a, 201b, 201c, etc., in the description.

The workflow setting information 202 stores therein workflows to be performed at the workflow folders 201. The workflow setting information 202 is set, for example, through a workflow setting screen on which each workflow is set.

Figure 3:
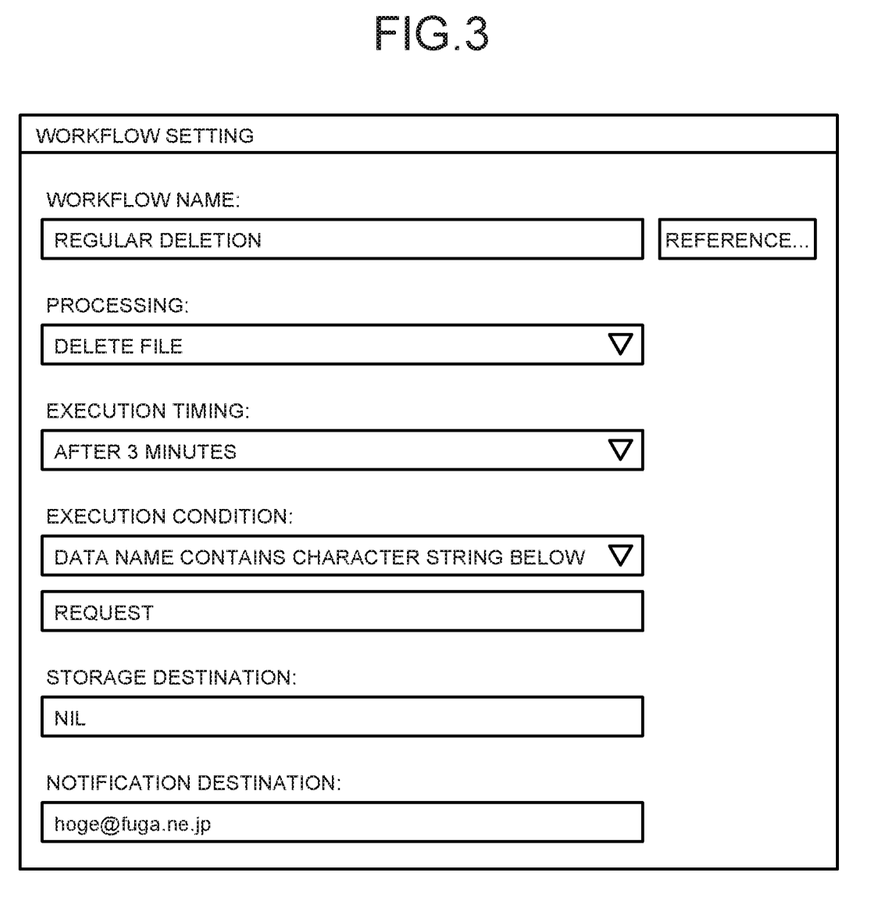
FIG. 3 is a diagram illustrating an example of a workflow setting screen according to the embodiment.

FIG. 3 is a diagram illustrating an example of the workflow setting screen according to the embodiment.

"Workflow name" is a name of a workflow. The workflow name is used as a name of a folder at which the workflow set on the workflow setting screen is performed. The workflow name is also used as information for specifying the predetermined storage area. In the example of FIG. 3, the workflow name is "regular deletion".

"Processing" indicates processing to be performed on data when the data is stored in a workflow folder 201. In the example of FIG. 3, the processing is "delete file". The file is data in any type. Examples of the file include document data created by, for example, word processing software or spreadsheet software, and image data. The processing may be any processing that can be performed on the stored data, such as "print file", "convert file format", and "copy file". A plurality of types of processing may be combined (for example, "convert file and copy file" and "copy file and print file").

When a plurality of types of processing are combined, each type of processing in the combined processing may be performed concurrently or sequentially. For example, when combined processing of "convert file and copy file" is performed, the information processing device 20 may convert the format of the file stored in the workflow folder 201 while copying the file in the original file format, or the information processing device 20 may first convert the file format and then copy the file in the converted file format.

"Execution timing" indicates a time period from when the data is stored in the workflow folder 201 to when the workflow processing is performed on the data. In the example of FIG. 3, the execution timing is "after 3 minutes". In this case, the workflow processing will be executed 3 minutes after the data is stored in the workflow folder 201.

"Execution condition" is a condition for determining, when data is stored in the workflow folder 201, whether the data is data to be subjected to the workflow processing set for the workflow folder 201. In the example of FIG. 3, the execution condition is "data name contains character string below". In the example of FIG. 3, whether the data name contains "request" is determined.

The execution condition may be any condition, such as "file has data format (extension) below", "file has data size below or smaller", "data is created by user below", or "document in file contains character string below", that can be determined from information on stored data (such as contents of the data or bibliographic information on the data).

"Storage destination" indicates a storage area for storing resulting process data obtained after the execution of the workflow processing. In the example of FIG. 3, the storage destination is "nil", because the set workflow processing is to delete data stored in the workflow folder 201. When the set processing is "copy file" as described above, the storage destination may be a storage area for storing the copied file, such as another folder in the information processing device 20 or a storage area in other devices. When the set processing is "print file", the storage destination may be information, such as the IP address or the MAC address of the MFP 50, for specifying the MFP 50 from which the file is printed.

"Notification destination" is information indicating the destination to which the result of the workflow processing is sent. In the example of FIG. 3, the notification destination is an email address "hoge@fuga.ne.jp".

The workflow setting screen may include other setting items than those described above. For example, when the set processing is "print file", the workflow setting screen may include other items for setting output conditions such as print conditions (setting on color/monochrome, combining, and duplex printing, for example).

Figure 4:
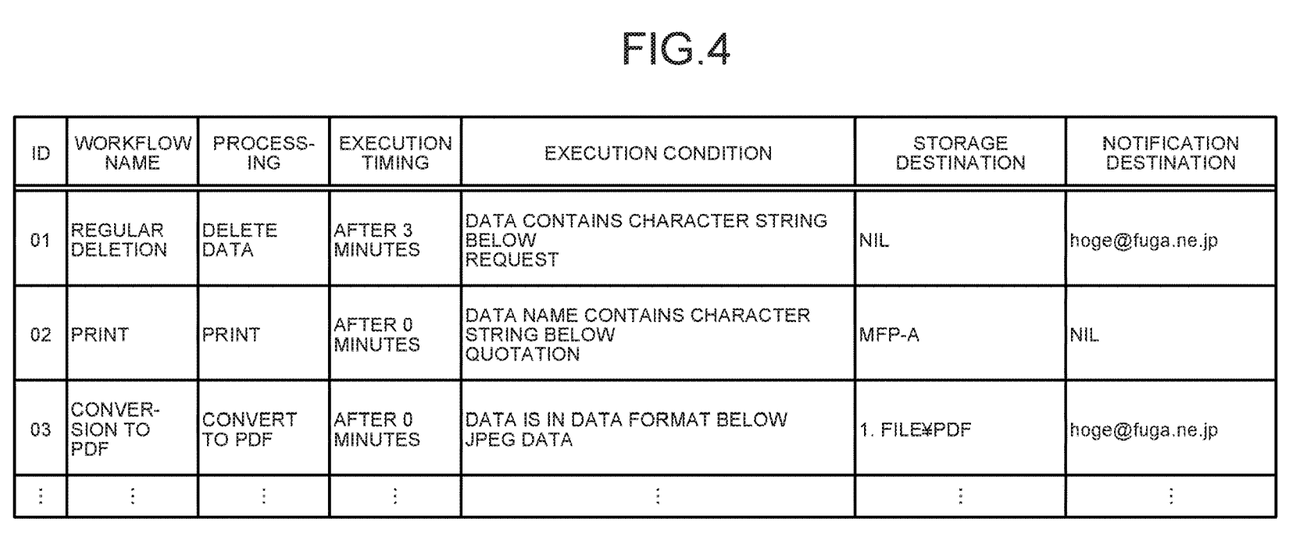
FIG. 4 is a diagram illustrating an example of workflow setting information according to the embodiment.

FIG. 4 is a diagram illustrating an example of the workflow setting information according to the embodiment. The workflow setting information according to the embodiment contains an ID, a workflow name, processing, execution timing, an execution condition, a storage destination, and a notification destination that are associated with each other. The ID is information for identifying each workflow. The workflow name, processing, execution timing, execution condition, storage destination, and notification destination are the same as those illustrated in FIG. 3, and thus the detailed explanation thereof is omitted.

The workflow setting information on a workflow having an ID of 01 is set through the workflow setting screen illustrated in FIG. 3. The workflow setting information on the workflow having the ID of 01 indicates a workflow in which, when data having a name containing a character string "request" is stored in a workflow folder 201a having a name of "regular deletion" and 3 minutes has passed since then, the data is deleted and the processing result is sent to the email address "hoge@fuga.ne.jp".

The workflow setting information on a workflow having an ID of 02 indicates a workflow in which, when data having a name containing "quotation" is stored in a workflow folder 201b having a name of "print", the data is immediately printed. Specifically, to print a file, the information processing device 20 converts the file format of a stored file to a printable file format supported by an MFP-A, and transmits a print request to the MFP-A to print the file in the converted file format. When the stored file already has a printable file format supported by the MFP-A, the information processing device 20 may transmit a print request to the MFP-A to print the stored file without converting the file format.

The workflow setting information on a workflow having an ID of 03 indicates a workflow in which, when data in a JPEG format is stored in a workflow folder 201c having a name of "conversion to PDF", the data is converted to PDF data immediately and stored in "1.FILE¥PDF", and then the processing result is sent to the email address "hoge@fuga.ne.jp". When the stored data is PDF data, the information processing device 20 may perform nothing, or may perform conversion as it does to data in other formats.

The information processing device 20 may store the workflow setting information 202 by reading, for example, a setting file including the workflow setting information 202.

Returning to FIG. 2, the detection unit 21 detects that data is stored in a workflow folder 201. Specifically, the detection unit 21 refers to workflow names in the workflow setting information 202 to specify the workflow folders 201 to be detected. The detection unit 21 monitors the specified workflow folders 201 at regular intervals as to whether any data is stored therein, and detects that data is stored in a workflow folder 201. When the detection unit 21 detects that data is stored in a workflow folder 201, the detection unit 21 sends a data determination request to the determining unit 22.

When the determining unit 22 receives the data determination request from the detection unit 21, the determining unit 22 refers to the workflow setting information 202 to determine whether the data satisfies the execution condition. Specifically, the determining unit 22 determines whether the data satisfies the execution condition associated with a workflow name in the workflow setting information 202 that is identical to the name of the workflow folder 201 in which the data is detected. When the data satisfies the execution condition, the determining unit 22 sends a data processing request to the execution unit 23.

When the data does not satisfy the execution condition, the determining unit 22 copies the data in the workflow folder 201 to the error folder 204, and deletes the data from the workflow folder 201. The error folder 204 is a predetermined folder provided in advance to store, for example, data that does not satisfy the execution condition. The determining unit 22 sends an error notification request to the notification unit 24 to notify the user who stores the data in the workflow folder 201 of an error indicating that the data does not satisfy the execution condition.

Figure 5:
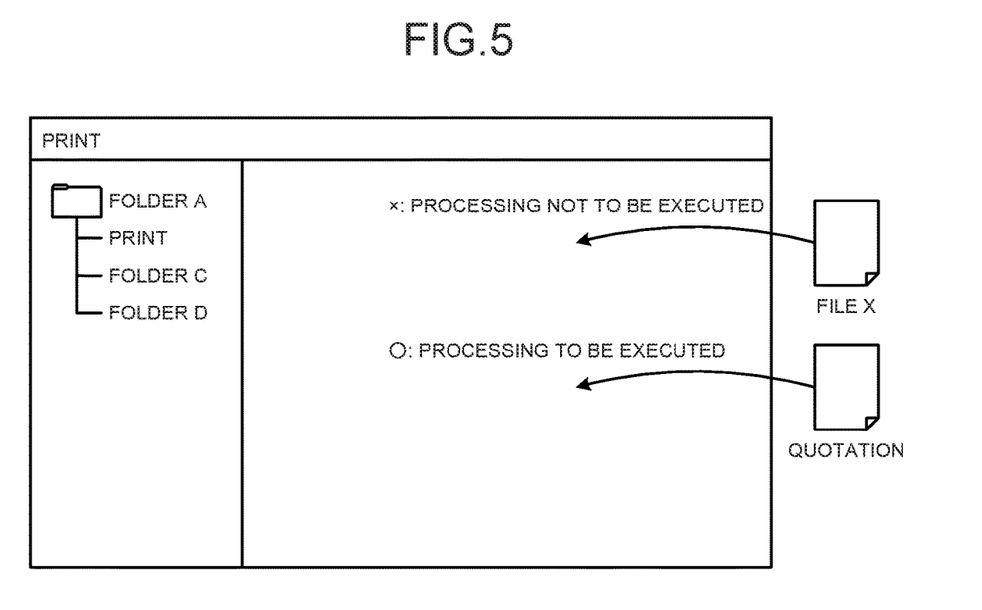
FIG. 5 is a diagram illustrating an example of determination whether data is a workflow processing subject according to the embodiment.

FIG. 5 is a diagram illustrating an example of determination whether data is a workflow processing subject according to the embodiment. This example of FIG. 5 illustrates a case in which the determining unit 22 determines the data stored in the workflow folder 201b that is set in accordance with the workflow setting information 202 (see FIG. 4) on the workflow having the ID of 02. The example of FIG. 5 illustrates a case for storing data in the workflow folder 201b by drag and drop of an icon representing the data into the workflow folder 201b by using, for example, a mouse of the personal computer 40. The execution condition in the workflow setting information 202 on the workflow having the ID of 02 is whether the data has a name containing "quotation". Thus, data having a name of "file X" is not allowed to be subjected to the workflow processing, but data having a name of "quotation" will be subjected to the workflow processing.

Returning to FIG. 2, when the execution unit 23 receives a data processing request from the determining unit 22, the execution unit 23 refers to the workflow setting information 202 to specify the workflow processing to be performed on the data, and performs the specified workflow processing on the data.

Specifically, the execution unit 23 performs workflow processing on data based on the execution timing and the processing associated with a workflow name in the workflow setting information 202 identical to the name of the workflow folder 201 in which the data is detected. When, for example, the processing is "print" and the execution timing is "after 0 minutes", the execution unit 23 immediately print the data by using the MFP 50. When, for example, the processing is "conversion to PDF" and the execution timing is "after 0 minutes", the execution unit 23 immediately converts the data to PDF data, and stores the PDF data in the normal folder 203. The normal folder 203 is specified by the storage destination associated with the workflow name in the workflow setting information 202 identical to the name of the workflow folder 201 in which the data is detected.

The execution unit 23 sends, to the notification unit 24, a notification request that requests the notification unit 24 to send an execution result notification indicating the execution result of the workflow processing to the notification destination associated with the workflow name in the workflow setting information 202 identical to the name of the workflow folder 201 in which the data is detected.

When the notification unit 24 receives, from the determining unit 22, a notification request that requests the notification unit 24 to send an error notification indicating that the data does not satisfy the execution condition, the notification unit 24 sends such an error notification to the user who stores the data in the workflow folder 201. The notification unit 24 specifies the user who stores the data in the workflow folder 201 by using, for example, login information of the user. The login information is necessary information in connecting, from the smart device 30, the personal computer 40, or other devices, to the information processing device 20 that executes the workflow processing. The login information is, for example, a user ID and a password for identifying the user. The notification unit 24 specifies the notification destination of the error notification from, for example, user information indicating information on the user. The user information includes, for example, the name and information on the notification destination of the user. The notification destination is, for example, an email address.

When the notification unit 24 receives, from the execution unit 23, a notification request that requests the notification unit 24 to send an execution result notification, the notification unit 24 sends the execution result notification to the notification destination associated with the workflow name in the workflow setting information 202 identical to the name of the workflow folder 201 in which the data is detected.

Described next is an information processing method according to the embodiment.

Figure 6A:
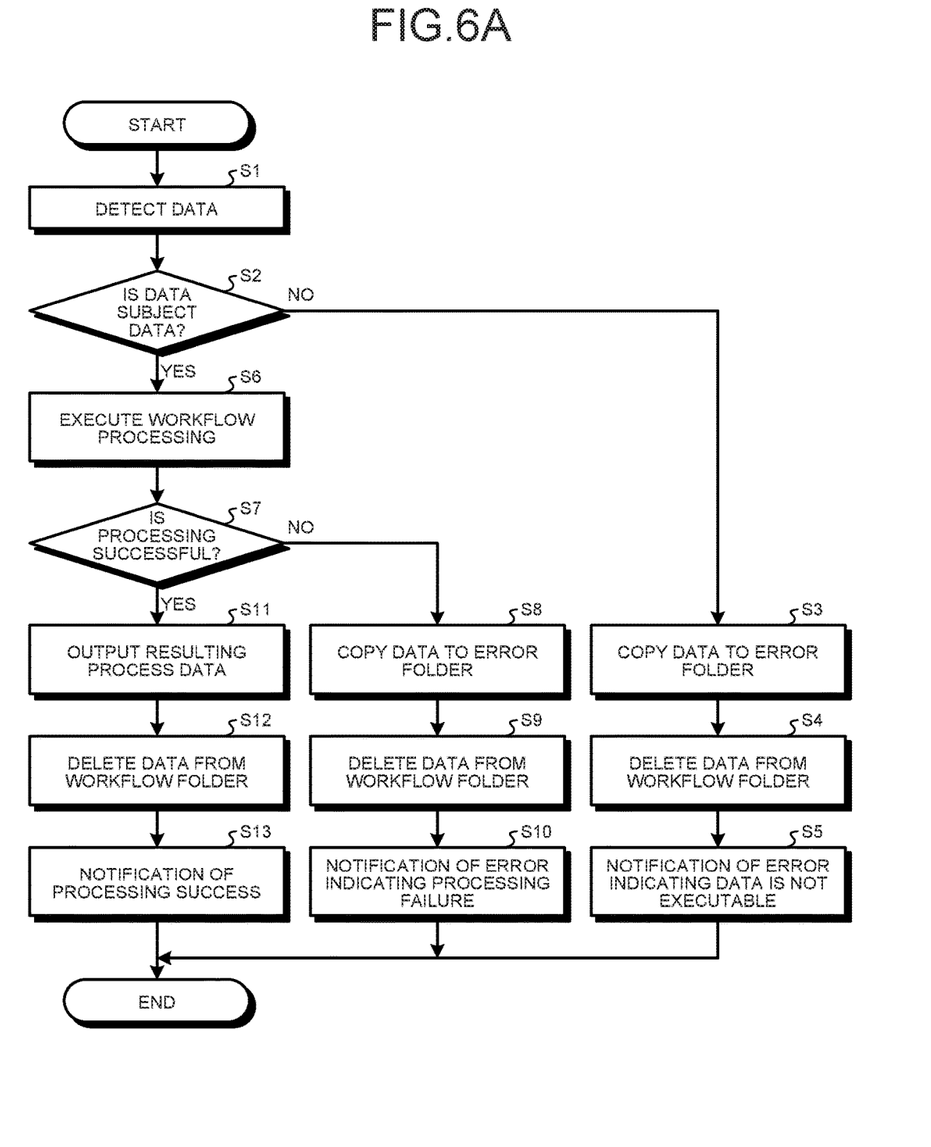
FIG. 6A is a flowchart illustrating a first example of workflow processing according to the embodiment.

FIG. 6A is a flowchart illustrating a first example of the workflow processing according to the embodiment. First, the detection unit 21 detects that data is stored in a workflow folder 201 (Step S1). Then, the determining unit 22 refers to the workflow setting information 202 to determine whether the data satisfies the execution condition (Step S2).

If the data does not satisfy the execution condition (No at Step S2), the determining unit 22 copies the data in the workflow folder 201 to the error folder 204 (Step S3). The determining unit 22 then deletes the data from the workflow folder 201 (Step S4). The notification unit 24 specifies the user who stores the data in the workflow folder 201 by the method described above, and sends an error notification indicating that the data does not satisfy the execution condition to the notification destination of the user (Step S5).

If the data satisfies the execution condition (Yes at Step S2), the execution unit 23 refers to the workflow setting information 202 to specify the workflow processing to be performed on the data, and performs the specified workflow processing on the data (Step S6). The execution unit 23 then determines whether the workflow processing is successful (Step S7).

If the workflow processing fails (No at Step S7), the execution unit 23 copies the data in the workflow folder 201 to the error folder 204 (Step S8). The execution unit 23 then deletes the data from the workflow folder 201 (Step S9). The notification unit 24 sends an execution result notification indicating failure of the workflow processing to the notification destination associated with the workflow name in the workflow setting information 202 identical to the name of the workflow folder 201 in which the data is detected (Step S10).

If the workflow processing is successful (Yes at Step S7), the execution unit 23 outputs resulting process data (Step S11). When, for example, the processing of the workflow is "print", the execution unit 23 outputs the resulting process data by printing it by using the MFP 50. When, for example, the processing of the workflow is "convert to PDF", the execution unit 23 outputs the resulting process data by storing it in the normal folder 203.

The execution unit 23 then deletes the data from the workflow folder 201 (Step S12). The notification unit 24 sends an execution result notification indicating success of the workflow processing to the notification destination associated with the workflow name in the workflow setting information 202 identical to the name of the workflow folder 201 in which the data is detected (Step S13).

As described above, in the information processing system 100 according to the embodiment, the detection unit 21 detects that data is stored in a predetermined storage area in a memory. The determining unit 22 determines whether the data stored in the predetermined storage area satisfies an execution condition of predetermined processing associated with the predetermined storage area. When the data satisfies the execution condition, the execution unit 23 executes the predetermined processing associated with the predetermined storage area. With this configuration, the information processing system 100 according to the embodiment can prevent data from being subjected to predetermined processing associated with a predetermined storage area when the data is stored in the predetermined storage area but the data is not intended to be subjected to such processing.

In the description of the embodiment above, the information processing device 20 is configured by a single device. However, the detection unit 21, the determining unit 22, the execution unit 23, and the notification unit 24 may be implemented by a plurality of information processing devices 20. This configuration is advantageous in load balancing of the workflow processing. In the same manner, the workflow folders 201, the workflow setting information 202, the normal folder 203, and the error folder 204 may be stored in the respective memories of a plurality of information processing devices 20.

Figure 6B:
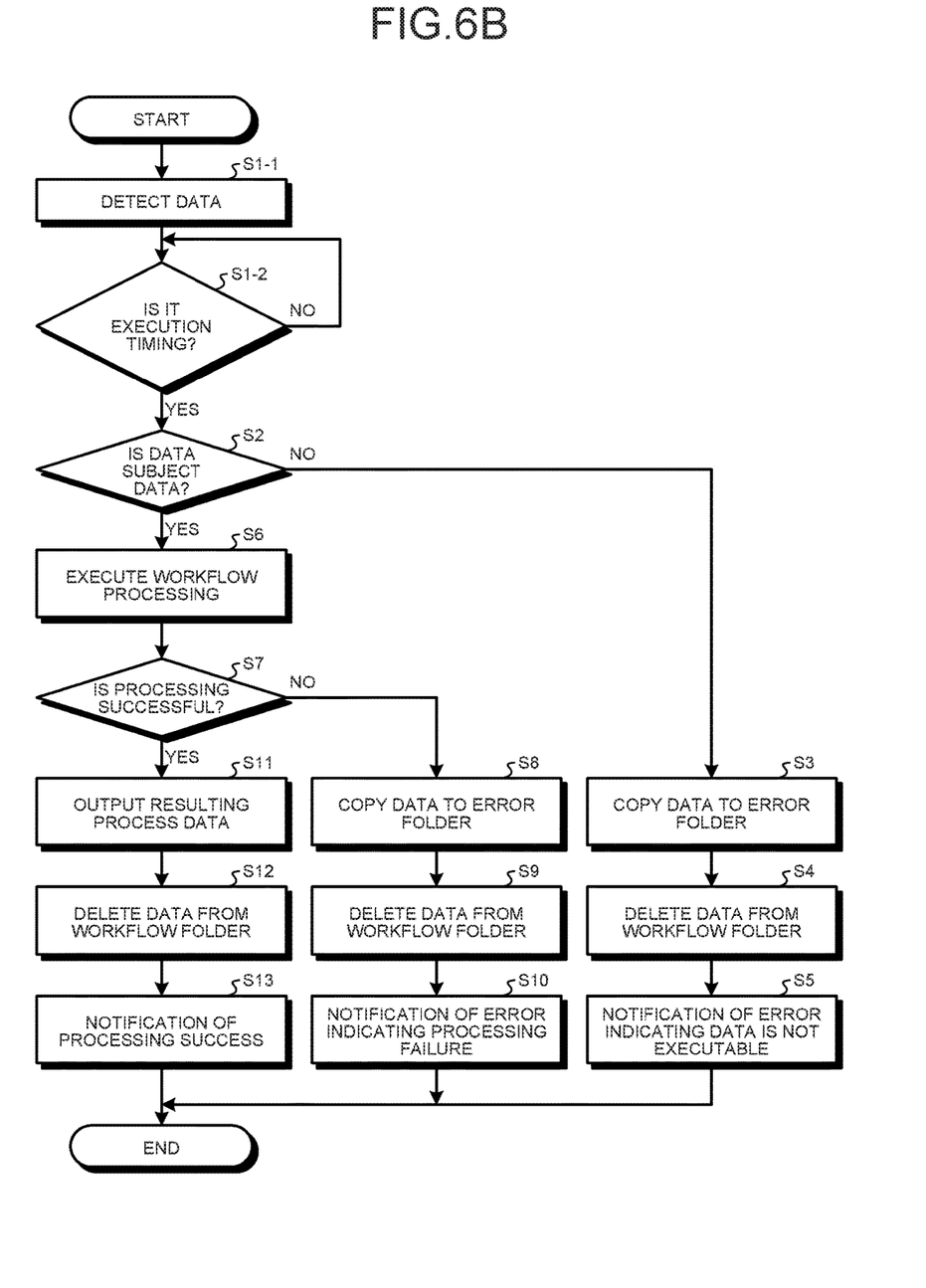
FIG. 6B is a flowchart illustrating a second example of the workflow processing according to the embodiment.
Figure 6C:
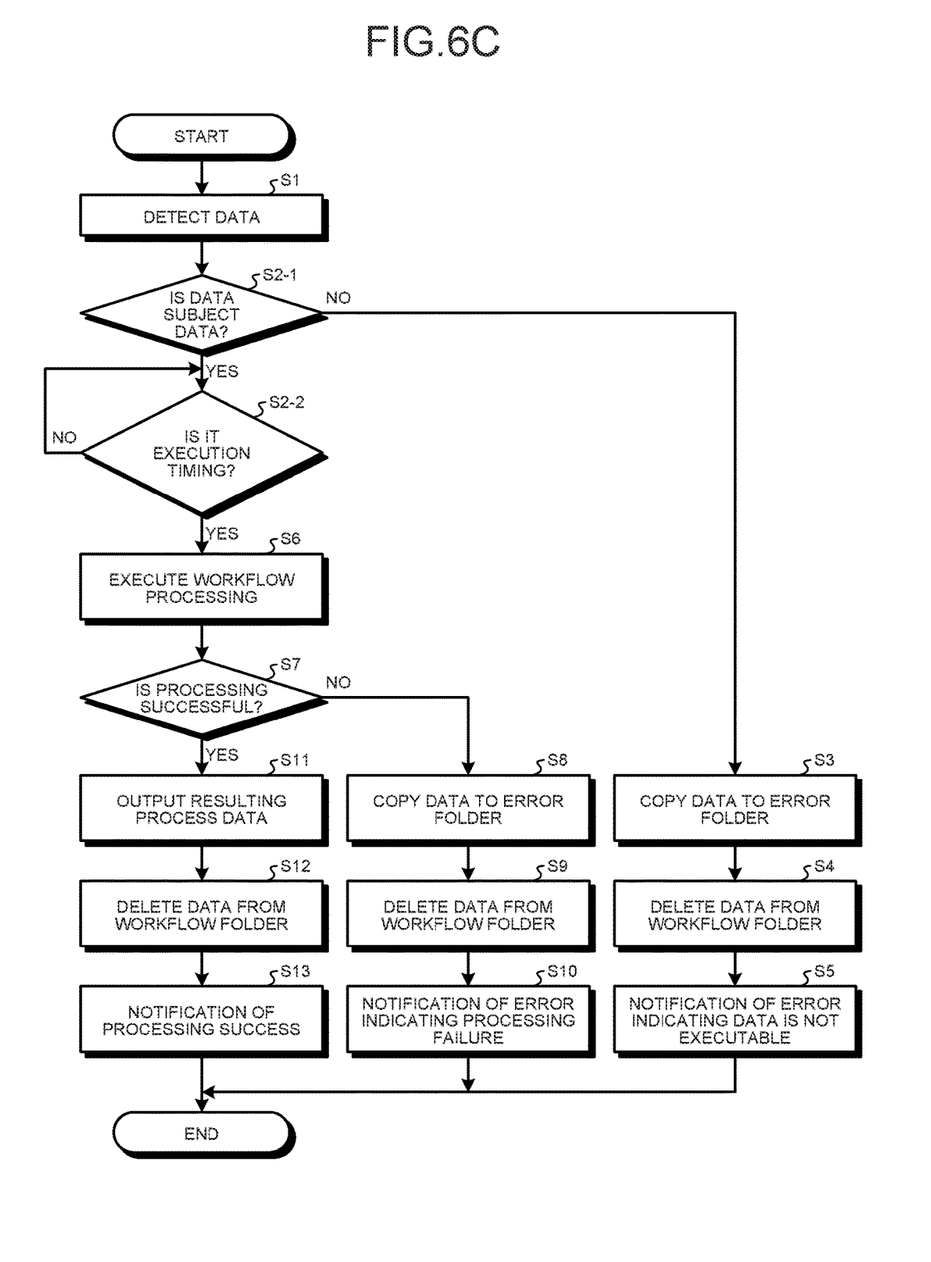
FIG. 6C is a flowchart illustrating a third example of the workflow processing according to the embodiment.

The timing at which the determining unit 22 determines whether data stored in a workflow folder 201 satisfies the execution condition is not necessarily when the data is detected by the detection unit 21. For example, as illustrated in FIG. 6B (Step S1-2) and FIG. 6C (Step S2-2), the determining unit 22 may determine whether the data satisfies the execution condition when the workflow performed is performed on the data stored in the workflow folder 201. When, for example, the workflow processing is executed 3 minutes after the data is stored in the workflow folder 201, the determining unit 22 may determine whether the data satisfies the execution condition 3 minutes after the data is stored in the workflow folder 201.

Modification of Embodiment

Described next is a modification of the embodiment. In the modification of the embodiment, a preferred embodiment is described in which the smart device 30 connects to the information processing device 20 and workflow processing is performed.

The configuration of the information processing system 100 according to the modification of the embodiment is the same as that of the information processing system 100 in the embodiment (see FIG. 1), and thus the explanation thereof is omitted. The functional configuration of the information processing device 20 according to the modification of the embodiment is the same as that of the information processing device 20 in the embodiment (see FIG. 2), and thus the explanation thereof is omitted.

Figure 7:
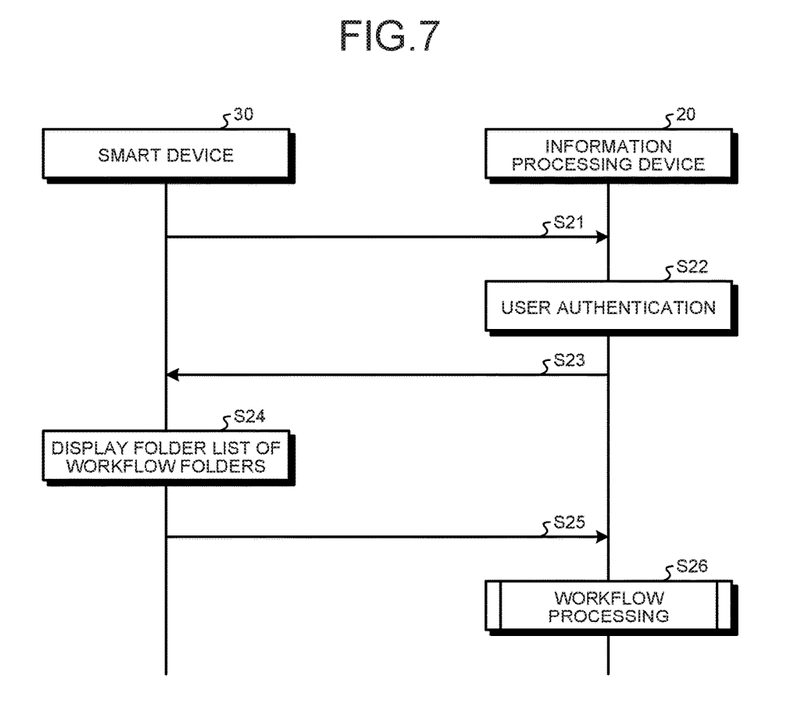
FIG. 7 is a sequence diagram illustrating a sequential process of an information processing method according to a modification of the embodiment.

FIG. 7 is a sequence diagram illustrating a sequential process of an information processing method according to the modification of the embodiment. First, the smart device 30 transmits login information to the information processing device 20 when a certain application of the smart device 30 receives specification of data to be subjected to workflow processing (Step S21). The login information is, for example, a user ID and a password for identifying the user. Then, the information processing device 20 authenticates the user by using the login information transmitted from the smart device 30 at Step S21 (Step S22).

Upon successful authentication of the user, the information processing device 20 transmits information for displaying a folder list screen of the workflow folders 201 to the smart device 30 (Step S23). The smart device 30 then displays the folder list screen of the workflow folders 201 (Step S24).

Figure 8A:
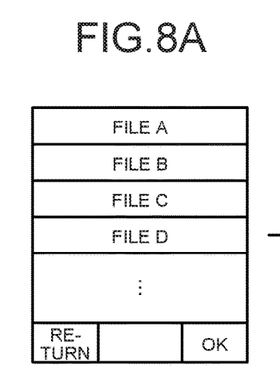
FIGS. 8A to 8C are diagrams illustrating an example of a folder list screen of workflow folders according to the modification of the embodiment.
Figure 8B:
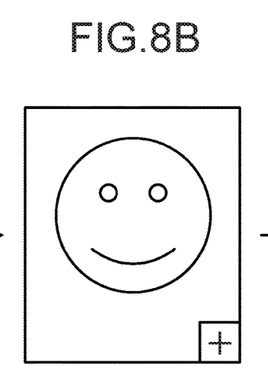
Figure 8C:
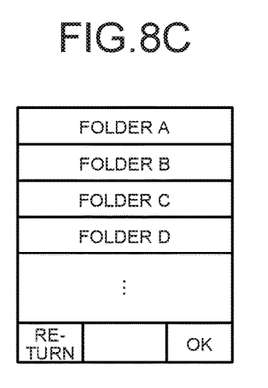

FIGS. 8A to 8C are diagrams illustrating an example of the folder list screen of the workflow folders 201 according to the modification of the embodiment. As illustrated in FIGS. 8A to 8C, for example, when a file A is selected in FIG. 8A, the smart device 30 displays the file A on its screen as illustrated in FIG. 8B. When a "+" button in FIG. 8B is selected, the smart device 30 displays a list of folders to which the file will be stored on its screen as illustrated in FIG. 8C. When a folder B in the folder list is selected and an OK button is pushed, the smart device 30 transmits data to be subjected to the workflow processing to the information processing device 20 and the data is stored in the folder B.

Returning to FIG. 7, the smart device 30 transmits, to the information processing device 20, data to be subjected to the workflow processing and information indicating the selection of the workflow folder 201 selected on the folder list screen displayed at Step S24 (Step S25). The information processing device 20 then executes the workflow processing (see FIG. 6A) described in the embodiment above (Step S26).

With this configuration, the information processing system 100 according to the modification of the embodiment can provide an effect similar to that of the information processing system 100 according to the embodiment. In other words, the information processing system 100 according to the modification of the embodiment can prevent data from being subjected to workflow processing associated with a storage area when the data is stored in the storage area but the data is not intended to be subjected to such processing.

Lastly, described is an example of a hardware configuration of the information processing device 20 according to the embodiment.

Figure 9:
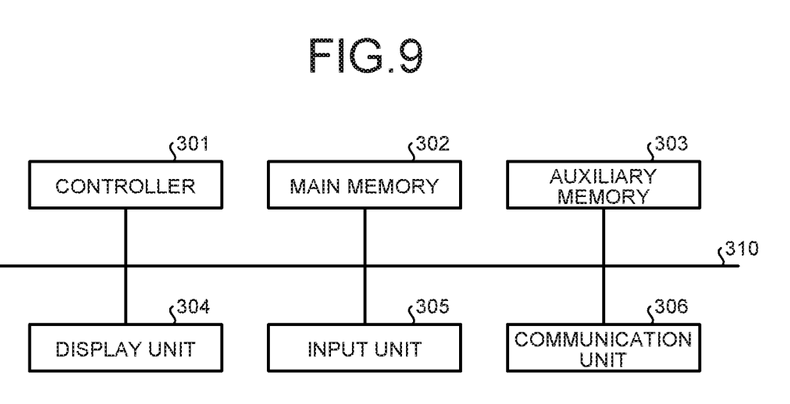
FIG. 9 is a diagram illustrating an example of a hardware configuration of the information processing device according to the embodiment.

FIG. 9 is a diagram illustrating an example of the hardware configuration of the information processing device 20 according to the embodiment. The information processing device 20 according to the embodiment includes a controller 301, a main memory 302, an auxiliary memory 303, a display unit 304, an input unit 305, and a communication unit 306. The controller 301, the main memory 302, the auxiliary memory 303, the display unit 304, the input unit 305, and the communication unit 306 are connected with one another via a bus 310. The information processing device 20 illustrated in FIG. 9 is, for example, a file server.

The controller 301 executes a computer program read from the auxiliary memory 303 and loaded onto the main memory 302. The main memory 302 is a memory configured by, for example, a read only memory (ROM) and a random access memory (RAM). The auxiliary memory 303 is configured by, for example, a memory card and a solid state drive (SSD).

The display unit 304 displays information. The display unit 304 is configured by, for example, a liquid crystal display. The input unit 305 receives an input of information. The input unit 305 is configured by, for example, a keyboard and a mouse. The communication unit 306 communicates with other devices.

The computer program executed by the information processing device 20 is recorded in a computer-readable recording medium such as a compact disc read only memory (CD-ROM), a memory card, a compact disc recordable (CD-R), and a digital versatile disc (DVD), as an installable or executable file, and provided as a computer program product.

The computer program executed by the information processing device 20 may be stored in a computer connected to a network such as the Internet and provided by being downloaded via the network. Furthermore, the computer program executed by the information processing device 20 may be provided via a network such as the Internet.

The computer program of the information processing device 20 may be embedded and provided in a ROM, for example.

The computer program of the information processing device 20 has a module configuration including functions of the configuration of the information processing device 20 according to the embodiment above that can be implemented by the computer program. The functions that can be implemented by the computer program are, for example, the detection unit 21, the determining unit 22, the execution unit 23, and the notification unit 24.

To implement the functions, the controller 301 reads the computer program from a storage medium such as the auxiliary memory 303 and executes it, and the functions to be implemented by the computer program are loaded onto the main memory 302. In other words, the functions implemented by the computer program are generated on the main memory 302.

A part or all of the functions of the information processing device 20 according to the embodiment may be implemented by hardware such as an integrated circuit (IC).

The present invention can prevent data from being subjected to predetermined processing associated with a predetermined storage area when the data is stored in the predetermined storage area but the data is not intended to be subjected to such processing.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing device comprising:
    a memory having computer-readable instructions stored thereon; and
    at least one processor communicatively coupled to the memory and configured to execute the computer-readable instructions to
        detect that first data is stored in a first workflow folder of a plurality of workflow folders,
        detect that second data is stored in a second workflow folder of the plurality of workflow folders,
        determine whether the first data satisfies a first execution condition associated with the first workflow folder,
        determine whether the second data satisfies a second execution condition associated with the second workflow folder, the second execution condition being a condition not associated with the first workflow folder,
        execute a first determined processing associated with the first workflow folder on the first data when the first data satisfies the first execution condition,
        execute a second determined processing associated with the second workflow folder on the second data when the second data satisfies the second execution condition,
        store a copy of the first data in an error folder when the first data does not satisfy the first execution condition, and
        delete the first data stored in the first workflow folder after the storage of the copy,
    wherein the copy of the first data is not stored in the error folder when the first data satisfies the first execution condition.

2. The information processing device according to claim 1, wherein
    the first execution condition is a condition for determining whether the first data contains a determined character string, and
    the at least one processor is further configured to execute the computer-readable instructions to execute the first determined processing on the first data when the first data contains the determined character string.

3. The information processing device according to claim 1, wherein
    the first execution condition is a condition for determining whether a name corresponding to the first data contains a determined character string, and
    the at least one processor is further configured to execute the computer-readable instructions to execute the first determined processing on the first data when the name contains the determined character string.

4. The information processing device according to claim 1, wherein
    the first execution condition is a condition for determining whether the first data has a determined data format, and
    the at least one processor is further configured to execute the computer-readable instructions to execute the first determined processing on the first data when the first data has the determined data format.

5. The information processing device according to claim 1, wherein the at least one processor is further configured to execute the computer-readable instructions to
    determine whether the first data satisfies the first execution condition at a first set time after detection that the first data is stored in the first workflow folder, the first set time being associated with the first workflow folder, and
    determine whether the second data satisfies the second execution condition at a second set time after detection that the second data is stored in the second workflow folder, the second set time being associated with the second workflow folder.

6. The information processing device according to claim 1, wherein the at least one processor is further configured to execute the computer-readable instructions to send an error notification indicating that the first data stored in the first workflow folder fails to satisfy the first execution condition to a notification destination of a user who stores the first data in the first workflow folder when the first data fails to satisfy the first execution condition.

7. The information processing device according to claim 6, wherein the notification destination of the user is an email address associated with a login of the user.

8. The information processing device according to claim 6, wherein the at least one processor is further configured to execute the computer-readable instructions to
    determine whether the first data satisfies the first execution condition at a first set time after detection that the first data is stored in the first workflow folder, the first set time being associated with the first workflow folder, and
    transmit the error notification when it is determined that the first data fails to satisfy the first execution condition after a set time has elapsed.

9. The information processing device according to claim 1, wherein failure to satisfy the first execution condition is indicative that a user mistakenly stored the first data in the first workflow folder.

10. The information processing device according to claim 1, wherein the second determined processing is different from the first determined processing.

11. The information processing device according to claim 10, wherein
    the first determined processing includes at least one first function of a set of functions, the set of functions including data deletion, printing, format conversion and copying, and
    the second determined processing includes a second function of the set of functions, the at least one first function not including the second function.

12. The information processing device according to claim 1, wherein the at least one processor is further configured to execute the computer-readable instructions to
  determine whether the first data satisfies the first execution condition at a first set time after detection that the first data is stored in the first workflow folder, the first set time being associated with the first workflow folder; and
  delete, out of pieces of the first data stored in the first workflow folder, data satisfying the first execution condition.

13. An information processing system comprising:
an information processing device; and
an electronic device communicatively coupled to the information processing device, wherein
the information processing device includes
  a memory having computer-readable instructions stored thereon, and
  at least one processor communicatively coupled to the memory and configured to execute the computer-readable instructions to
    detect that first data is stored in a first workflow folder of a plurality of workflow folders,
    detect that second data is stored in a second workflow folder of the plurality of workflow folders,
    determine whether the first data satisfies a first execution condition associated with the first workflow folder,
    determine whether the second data satisfies a second execution condition associated with the second workflow folder, the second execution condition being a condition not associated with the first workflow folder,
    execute a first determined processing associated with the first workflow folder on the first data when the first data satisfies the first execution condition,
    execute a second determined processing associated with the second workflow folder on the second data when the second data satisfies the second execution condition,
    store a copy of the first data in an error folder when the first data does not satisfy the first execution condition, and
    delete the first data stored in the first workflow folder after the storage of the copy,
  wherein the copy of the first data is not stored in the error folder when the first data satisfies the first execution condition.

14. The information processing system according to claim 13, wherein the electronic device is configured to
accept login credentials from a user, and
perform authentication using the login credentials.

15. The information processing system according to claim 13, wherein the electronic device includes a user interface configured to accept a user selection of the first workflow folder from among the plurality of workflow folders.

16. The information processing system according to claim 15, wherein the user interface is further configured to accept a user selection of the first data from among a set of data.

17. The information processing system according to claim 16, wherein the electronic device is configured to send the first data to the information processing device in response to the user selection.

18. The information processing system according to claim 13, wherein the electronic device is configured to
  display a first setting screen on which setting content in the first workflow folder, the first execution condition, and a time period from when the first data is stored in the first workflow folder to when the setting content is performed are settable, and
  display a second setting screen on which setting content in the second workflow folder, the second execution condition, and a time period from when the second data is stored in the second workflow folder to when the setting content is performed are settable.

19. A non-transitory recording medium including a computer program that, when executed by at least one processor, causes the at least one processor to:
  detect that first data is stored in a first workflow folder of a plurality of workflow folders;
  detect that second data is stored in a second workflow folder of the plurality of workflow folders;
  determine whether the first data satisfies a first execution condition associated with the first workflow folder;
  determine whether the second data satisfies a second execution condition associated with the second workflow folder, the second execution condition being a condition not associated with the first workflow folder;
  execute a first determined processing associated with the first workflow folder on the first data when the first data satisfies the first execution condition;
  execute a second determined processing associated with the second workflow folder on the second data when the second data satisfies the second execution condition;
  store a copy of the first data in an error folder when the first data does not satisfy the first execution condition; and
  delete the first data stored in the first workflow folder after the storage of the copy,
  wherein the copy of the first data is not stored in the error folder when the first data satisfies the first execution condition.

* * * * *